No. 702,669. Patented June 17, 1902.
F. OPRENDEK.
SOUND STRENGTHENING APPLIANCE FOR TELEPHONE STATIONS.
(Application filed Apr. 29, 1901.)
(No Model.)
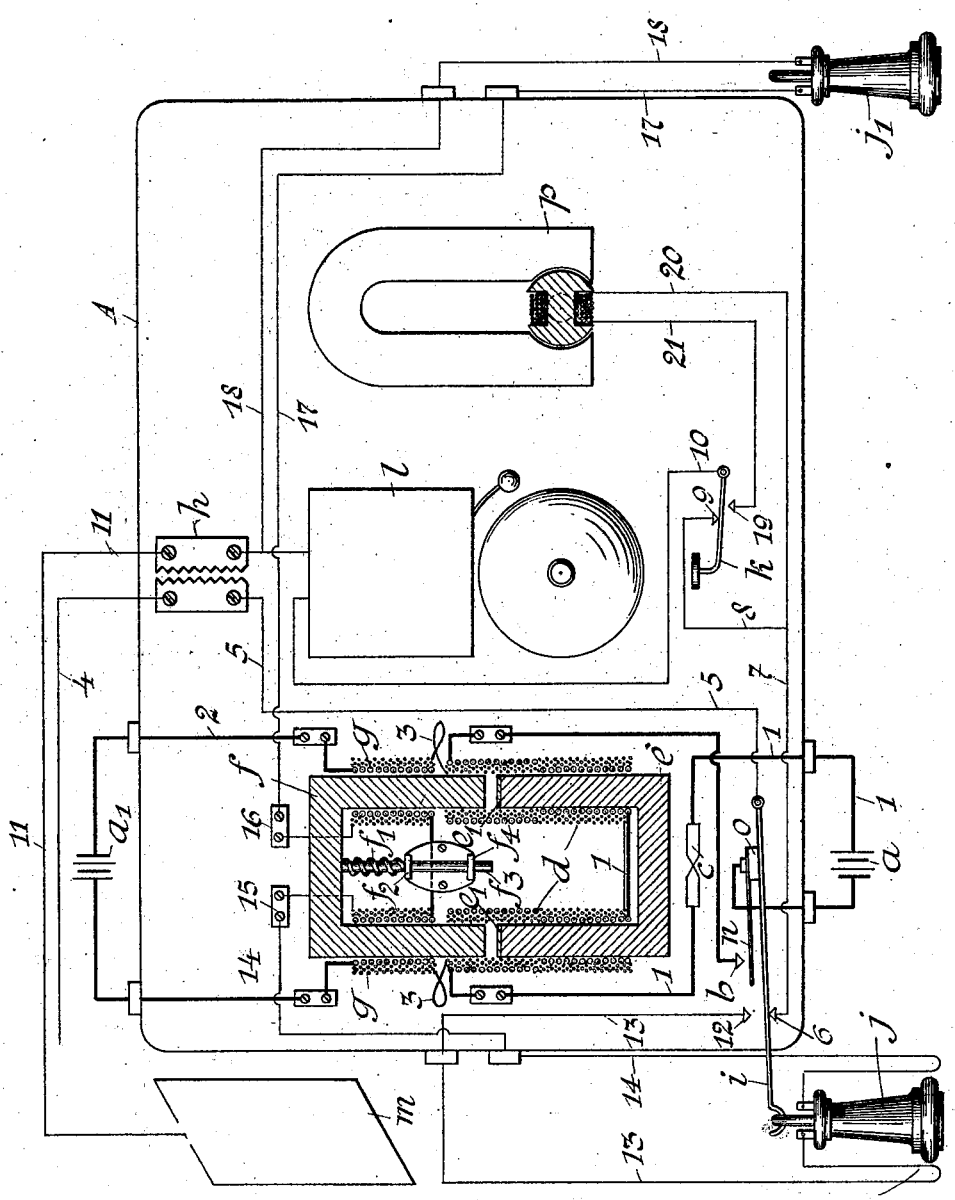
Witnesses.
Josef Prohaska
Hermann Wunderlich
Inventor.
Franz Oprendek
per Anton von Herr
Attorney.

UNITED STATES PATENT OFFICE.

FRANZ OPRENDEK, OF VIENNA, AUSTRIA-HUNGARY, ASSIGNOR TO LOUIS RÖDER, OF VIENNA, AUSTRIA-HUNGARY.

SOUND-STRENGTHENING APPLIANCE FOR TELEPHONE-STATIONS.

SPECIFICATION forming part of Letters Patent No. 702,669, dated June 17, 1902.

Application filed April 29, 1901. Serial No. 58,084. (No model.)

*To all whom it may concern:*

Be it known that I, FRANZ OPRENDEK, a subject of the Emperor of Austria-Hungary, residing at Vienna, in the Province of Lower Austria and Empire of Austria-Hungary, have invented a new and useful Sound-Strengthening Appliance for Telephone-Stations, of which the following is a specification.

My invention relates to telephone-stations of the usual kind, in which a closed circuit contains the primary coil of an inductorium, a galvanic battery, and the microphone, while the secondary coil of the said inductorium has one end connected with an earth return and the other end with the line in which the telephone-receivers are interposed.

The invention has for its object to provide an appliance by addition of which to telephone-stations of the kind referred to the loudness of transmittal sound is increased.

According to my invention an electromagnet is formed by placing a soft-iron core in the induction-coil, and in front of the poles of this electromagnet an armature is so mounted that it can reciprocate under the action of the variations of the magnetic force. The said armature, adapted to reciprocate in front of the poles of the electromagnet, is surrounded by magnetizing-coils which are interposed in the circuit of a special galvanic battery and so magnetize the said armature that it turns unlike poles toward the poles of the electromagnet. Around the said magnetizing-coils of thick wire other coils made of thin wire are arranged, these outer coils being interposed in the secondary circuit of the aforesaid inductorium. When the armature reciprocates under the action of the variations of the magnetic force, the work required for moving it is not performed by the current produced by the galvanic battery of the telephone-station, but by the current flowing through the magnetizing-coils of the armature, and the effect of the reciprocation of the magnetized armature is that owing to the varying expenditure of energy an alternating current of the same form and phase as the current flowing in the telephone-line is induced in the thin-wire coils and strengthens this latter current.

To enable my invention to be fully understood, I will describe how it can be carried into practice by reference to the accompanying drawing, which represents a diaphragm of a telephone-station provided with my sound-strengthening appliance.

A is a board on which all the parts of the telephone-station are mounted, and $a$ is the galvanic battery, the circuit of which is shown in thicker lines and is broken at $b$ when the instrument is not used. In this circuit are interposed the microphone $c$ and the primary coils of the inductorium, which is divided into two bobbins $d$ and $d$ in order to admit of a horseshoe-electromagnet $e$ being magnetized by them. In front of the poles of the horseshoe-core $e$ are arranged the ends of the horseshoe-armature $f$, which rests on a coiled spring $f'$, supported by a bracket $f^2$, and has secured to its middle a pin $f^3$, guided in holes in the brackets $f^2$ and $f^4$.

Supposing the primary circuit 1 to be closed, the core $e$ will be magnetized by the coils $d$, and when the microphone $c$ is spoken to the resistance of the circuit will vary, and the variations of the strength of current thereby caused will also produce variations of the magnetic force. By the magnetic force the armature $f$ is moved toward the core $e$, the poles of which are covered with disks $e'$, of cotton or paper, by which immediate contact and permanent adhering of the armature is prevented. While the armature $f$ moves toward the core $e$ it compresses the coiled spring $f'$ and stores power in the same, and as soon as the magnetic force diminishes the stored power acts for lifting the core. By the following increase of magnetic force the armature $f$ is again caused to move toward the core $e$, and so on.

If the work of repeatedly attracting the armature $f$ and compressing the spring $f'$ were to be done at the expense of the energy of the current flowing through the primary coils of the bobbins $d$, the said current would thereby be weakened, and consequently the induced current, too, by which the telephone-receivers are actuated. Now in order to attain the object in view, which is to strengthen this latter current, I provide a special galvanic battery $a'$ for supplying the energy required for reciprocating the armature $f$. By two bobbins $gg$, having their thick wire coils included in the circuit 2 of the battery $a'$, the armature $f$ is so magnetized as to oppose unlike poles to the poles of the core $e$. Every time the armature $f$ moves toward the poles of the core $e$, and thereby puts the spring $f'$ in tension, energy is spent by the current flowing through the primary coils of the bobbins $d\,d$. Consequently an alternating current of the same form and phase as that induced in the secondary coils of the bobbins $d\,d$ will be induced in the secondary coils of the bobbins $g\,g$. This current can therefore be utilized for strengthening the current flowing through the line, this being obtained by connecting the secondary coils by wires 3 3. The effect of this strengthening of the secondary current is different from that which would be obtained by strengthening the galvanic battery $a$, as in the latter case too strong a primary current would flow through the microphone $c$, which thereby would be heated and deranged in its normal operation.

A further strengthening action upon the secondary current for the purpose of louder transmission of speech is obtained by extending the bobbins $d\,d$ beyond the poles of the core $e$, as shown, and arranging the ends of the armature $f$ within the extended bobbins $d\,d$. The magnetized armature $f$ oscillating within the bobbins $d$ induces in the secondary coils alternating-current waves, and as the oscillations are in unison with the undulations of the primary current flowing through the microphone the said alternating current adds itself to the alternating current induced by the undulating current. As in this action the ends of the armature $f$ are intended to act upon the secondary coils of the induction-bobbins $d\,d$, the extended ends of the said bobbins have the secondary coils of thin wire arranged inside the primary ones, while in the lower portions of both bobbins $d\,d$, intended to magnetize the core $e$, the primary coils of thick wire are arranged inside, as usual. All parts being in the position shown in the drawing, an electric current arriving through the line-wire 4 will pass through the lightning-arrester $h$ and the wire 5 to the metallic spring-lever $i$, which is kept on the contact 6 by the telephone $j$ suspended from it. From the contact-piece 6 the current flows through the wires 7 and 8 to the contact-piece 9, on which bears the metallic spring-key $k$. Thence the current passes through the wire 10 to the call-bell $l$, of well-known construction, and operating this call-bell its flows through the wire 11 to the earth $m$. The operator called by the signal unhooks the telephone-receiver $j$, whereby the spring-lever $i$ is unloaded and permitted to swing upward under the action of its spring. The lever $i$ then touches the contact-piece 12, while the spring $n$, secured to it and insulated from it by means of a block $o$, made of insulating material, touches the contact-piece $b$. It will be seen that thus the primary circuit 1 is closed at $b$ and the secondary circuit at 12. The connections of this latter are as follows: Line-wire 4, lightning-arrester $h$, wire 5, lever $i$, contact-piece 12, wire 13, telephone-receiver $j$, wire 14, binding-clamp 15, secondary coils of the bobbins $g$, $d$, $d$, and $g$, binding-clamp 16, wire 17, second telephone-receiver $j'$, wire 18, lightning-arrester $h$, wire 11, and earth $m$. For calling a corresponding station the operator presses downward the metallic spring-key $k$, thereby causing it to recede from the contact-piece 9 and to bear against the contact-piece 19, and while keeping the key $k$ depressed he operates the magneto-electric current-generator $p$. The electric current thus generated flows through the wires 20 and 7, the contact-piece 6, the lever $i$, the wire 5, and the lightning-arrester $h$ into the line 4, while the other pole of the generator $p$ is connected with the earth $m$ by the wire 21, contact-piece 19, key $k$, wire 10, call-bell $l$, lightning-arrester $h$, and wire 11.

I have shown and described a horseshoe-core and horseshoe-armature; but obviously both or either of these parts may be formed by straight bars or a straight bar.

Having thus described my invention, what I claim, and desire to secure by Letters Patent of the United States, is—

1. In a telephone-station, the combination with the inductorium of a soft-iron core inserted into the same, a soft-iron armature so mounted in front of the poles of the said core as to be enabled to oscillate under the action of the variations of the magnetic force, a magnetizing coil or coils interposed in the circuit of a special current-generator and so surrounding the said armature as to cause an unlike pole or unlike poles to be formed in front of the pole or poles of the core, and a secondary coil or coils surrounding the said magnetizing-coils of the armature and connected in series with the secondary coil or coils of the inductorium, substantially as set forth and for the purpose described.

2. In a telephone-station, the combination with the inductorium of a soft-iron core inserted into the same, a soft-iron armature so mounted in front of the poles of the said core as to be enabled to oscillate under the action of the variations of the magnetic force, a magnetizing coil or coils interposed in the circuit of a special current-generator and so surrounding the said armature as to cause an unlike pole or unlike poles to be formed in front of the pole or poles of the core, and a secondary coil or coils surrounding the said magnetizing-coils of the armature and connected in series with the secondary coil or coils of the inductorium, the bobbin or bobbins of the said inductorium being extended beyond the poles of the core, and the pole or poles of the armature projecting into the extended bobbin or bobbins of the inductorium, substantially as set forth and for the purpose described.

In witness whereof I have signed this specification in presence of two witnesses.

FRANZ OPRENDEK.

Witnesses:
VINTON KREUGH,
ALVESTO S. HOGUE.